(12) United States Patent
Harper et al.

(10) Patent No.: US 11,619,614 B2
(45) Date of Patent: Apr. 4, 2023

(54) METHOD AND APPARATUS FOR DETERMINING AN INTERMEDIATE LAYER CHARACTERISTIC

(71) Applicant: Tribosonics Limited, Sheffield (GB)

(72) Inventors: Philip Harper, Sheffield (GB); Tapiwa Mutasa, Westland, MI (US)

(73) Assignee: Tribosonics Limited, Sheffield (GB)

( * ) Notice: Subject to any disclaimer, the term of this patent is extended or adjusted under 35 U.S.C. 154(b) by 27 days.

(21) Appl. No.: 17/281,710

(22) PCT Filed: Oct. 1, 2019

(86) PCT No.: PCT/GB2019/052762
§ 371 (c)(1),
(2) Date: Mar. 31, 2021

(87) PCT Pub. No.: WO2020/070481
PCT Pub. Date: Apr. 9, 2020

(65) Prior Publication Data
US 2021/0396719 A1    Dec. 23, 2021

(30) Foreign Application Priority Data

Oct. 1, 2018  (GB) .................................. 1816017.6

(51) Int. Cl.
| | | |
|---|---|---|
| *G01N 29/46* | (2006.01) | |
| *G01N 29/44* | (2006.01) | |
| *G01N 29/50* | (2006.01) | |

(52) U.S. Cl.
CPC ......... *G01N 29/46* (2013.01); *G01N 29/4418* (2013.01); *G01N 29/4436* (2013.01);
(Continued)

(58) Field of Classification Search
CPC ............... G01N 29/46; G01N 29/4418; G01N 29/4436; G01N 29/50; G01N 2291/0231; G01N 2291/02854
(Continued)

(56) References Cited

U.S. PATENT DOCUMENTS

| | | |
|---|---|---|
| 5,663,502 A | 9/1997 | Nagashima et al. |
| 5,812,261 A | 9/1998 | Nelson et al. |
| | (Continued) | |

FOREIGN PATENT DOCUMENTS

| | | |
|---|---|---|
| CN | 105651689 | 6/2016 |
| DE | 10028519 | 1/2002 |
| | (Continued) | |

OTHER PUBLICATIONS

UK Search Report for corresponding Application No. GB1816071.6, dated Feb. 25, 2019—4 pages.
(Continued)

*Primary Examiner* — Lisa M Caputo
*Assistant Examiner* — Rose M Miller
(74) *Attorney, Agent, or Firm* — Dority & Manning, PA (57) ABSTRACT

Disclosed is a method of determining a characteristic of a measurement intermediate layer (220) in a multilayer structure (200) using an ultrasonic transducer (100), wherein the multilayer structure (200) includes a first layer (210), a measurement intermediate layer (220) and a third layer (230) in series abutment. The method comprises transmitting a measurement ultrasonic signal into the first layer (210) towards the measurement intermediate layer (22)0, measuring a measurement reflection of the measurement ultrasonic signal from the multilayer structure (200), determining, using the measurement reflection, a measured frequency response of the measurement intermediate layer (220), determining a plurality of modelled frequency responses of the measurement intermediate layer (220), comparing the measured frequency response to the plurality of modelled frequency responses, and determining the characteristic of the measurement intermediate layer (220) based on the comparison of the measured frequency response and the plurality of modelled frequency responses.

16 Claims, 7 Drawing Sheets

(52) U.S. Cl.
CPC ..... *G01N 29/50* (2013.01); *G01N 2291/0231* (2013.01); *G01N 2291/02854* (2013.01)

(58) Field of Classification Search
USPC .......................................................... 73/579
See application file for complete search history.

(56) References Cited

U.S. PATENT DOCUMENTS

| | | | |
|---|---|---|---|
| 6,128,081 A | 10/2000 | White et al. | |
| 6,397,680 B1 | 6/2002 | Levesque et al. | |
| 6,481,289 B2* | 11/2002 | Dixon | G01N 29/50 |
| | | | 73/602 |
| 7,066,027 B2 | 6/2006 | Dwyer-Joyce et al. | |
| 2005/0159855 A1 | 7/2005 | Sugiura et al. | |
| 2011/0218743 A1* | 9/2011 | Smith | G01N 29/46 |
| | | | 702/56 |
| 2016/0172254 A1 | 6/2016 | Wimplinger | |

FOREIGN PATENT DOCUMENTS

| | | | | |
|---|---|---|---|---|
| EP | 0487871 | | 6/1992 | |
| EP | 1679513 A2 | * | 7/2006 | ......... G01B 11/0666 |
| JP | 2004028803 | | 1/2004 | |
| RU | 2305134 | | 8/2007 | |

OTHER PUBLICATIONS

PCT International Preliminary Report on Patentability for corresponding PCT Application No. PCT/GB2019/052762, dated Mar. 23, 2021—8 pages.

Praher et al., "Ultrasound-based measurement of liquid-layer thickness: A novel time-domain approach." Mechanical Systems and Signal Processing, Amsterdam, NL, vol. 82. May 21, 2016, pp. 166-177.

Reddyhoff et al., "Ultrasonic measurement of film thickness in mechanical seals," Sealing Technology, Elsevier Advanced Technology, Kidlington, GB, vol. 2006, No. 7. Jul. 1, 2006, pp. 7-11.

Hunter et al., "Calibration and validation of ultrasonic reflection methods for thin-film measurement in tribology," Measurement Science and Technology, IOP, Bristol, GB, vol. 23, No. 10, Sep. 14, 2012—24 pages.

PCT International Search Report and Written Opinion for corresponding PCT Application No. PCT/GB2019/052762, dated Dec. 5, 2019, 11 pages.

* cited by examiner

METHOD AND APPARATUS FOR DETERMINING AN INTERMEDIATE LAYER CHARACTERISTIC

This application is a national phase application of International Application No. PCT/GB2019/052762 filed on Oct. 1, 2019, which, in turn, is based upon and claims the right of priority to GB Patent Application No. 1816017.6 filed on Oct. 1, 2018, the disclosures of both of which are hereby incorporated by reference herein in their entirety for all purposes.

TECHNICAL FIELD

The invention relates to methods and apparatus to determine characteristics of a material in a structure through the use of ultrasonic techniques. In particular, the invention relates to a method for determining the thickness of an intermediate layer in a multi-layered structure.

BACKGROUND

Multilayer structures may exist in a vast array of different devices, assemblies, or constructions. Understanding the internal arrangement of a multilayer structure may be important for a variety of reasons, for example they may affect the design, construction, operation, or analysis of a device. Multilayer structures may comprise one or more intermediate layers that are not directly accessible during normal use of the device. In such a case, methods and apparatus can be used to perform measurements on an internal part of the structure. Such measurements include, for example electric measurements, optical or other electromagnetic measurements, or ultrasonic measurements. Ultrasonic measurements may be performed by a transducer; a device that converts an electrical signal to an ultrasonic signal, and which can further convert a received ultrasonic signal into an electrical signal.

Ultrasonic transducers are commonly realised using piezoelectric technology in which a piezoelectric element can be used as a transmitter, receiver, or transceiver. In a transmitter, the piezoelectric element is placed local to a target and electrically excited such that ultrasonic waves can pass from the transducer into the target. In a receiver, ultrasonic waves are received by the piezoelectric element which converts the returning wave into an electrical signal which can be analysed using suitable techniques. A transceiver is capable of both transmitting and receiving ultrasonic waves.

As an example, a transducer may convert an electrical signal into an ultrasonic signal, transmit this ultrasonic signal into a multilayer structure, receive a reflected signal, and convert this reflected signal into an electrical signal. The reflected signal may contain information about the structure it has travelled through and reflected from, which can be analysed using suitable techniques.

Many techniques exist for interrogating multi-layered structures. These include a method for determining a layer thickness by comparing a time-domain measurement to a model of that measurement, as described in a paper by B. Praher and G. Steinbichler, titled 'Ultrasound-based measurement of liquid-layer thickness: a novel time-domain approach'. Another technique is described in the paper 'The measurement of lubricant-film thickness using ultrasound' by R. S, Dwyer-Joyce, B. W. Drinkwater, and C. J. Donohoe. However, each of these techniques suffer with drawbacks. For example, the complexity and/or potential inaccuracies of modelling a time-domain signal, limitations in the range of thicknesses that can be measured using a single technique, or required knowledge of or limitations to the multilayer structure in order for the method to work.

The present invention seeks to provide an improved method and apparatus for determining a characteristic of an intermediate layer in a multilayer structure.

SUMMARY

The present invention provides a method and apparatus for determining a characteristic of an intermediate layer in a multilayer structure according to the appended claims.

Described below is a method of determining a characteristic of a measurement intermediate layer in a multilayer structure using an ultrasonic transducer, wherein the multilayer structure includes a first layer, a measurement intermediate layer and a third layer in series abutment. The method comprising transmitting a measurement ultrasonic signal into the first layer towards the measurement intermediate layer; measuring a measurement reflection of the measurement ultrasonic signal from the multilayer structure; determining, using the measurement reflection, a measured frequency response of the measurement intermediate layer; determining a plurality of modelled frequency responses of the measurement intermediate layer; comparing the measured frequency response to the plurality of modelled frequency responses; and determining the characteristic of the measurement intermediate layer based on the comparison of the measured frequency response and the plurality of modelled frequency responses.

The plurality of modelled frequency responses according to the method may be provided by a plurality of values of a model frequency response.

The method may further comprise generating a reference ultrasonic signal in a reference structure, the reference structure includes a reference first layer and a reference intermediate layer; measuring a reference reflection of the reference ultrasonic signal on a reference structure. Determining a measured frequency response of the intermediate layer may further be based on the reference reflection.

The reference ultrasonic signal according to the method may be identical to the measurement ultrasonic signal.

The reference intermediate layer according to the method may have a front surface into which the reference ultrasonic signal is received and a back surface, wherein the reference reflection does not include a reflection from the back surface of the reference intermediate layer.

The reference first layer and the measurement first layer according to the method may comprise the same material and thickness, and the reference intermediate layer and measurement intermediate layer may comprise the same material, and the time of flight of the reference signal in the reference intermediate layer is greater than the duration of the reference signal in the reference first layer.

The method may further comprise increasing the separation of third layer and first layer to increase the thickness of the measurement intermediate layer prior to sending the reference signal to provide the reference structure.

The measurement reflection and reference reflection according to the method may be filtered prior to performing a frequency domain transformation.

The filtering according to the method may comprise a matched filtering technique.

The matched filtering technique according to the method may comprise calculating an autocorrelation of the reference reflection, and calculating a cross-correlation of the reference reflection and the measurement reflection;

Determining the measured frequency response according to the method may comprise calculating frequency domain transforms of the autocorrelation and of the cross-correlation, and dividing the frequency transform of the cross-correlation by the frequency transform of the autocorrelation.

The frequency domain transforms according to the method may be Fourier transforms.

The method may further comprise calculating a normalised effective measured interface response using the measured frequency response; determining a normalised effective model interface response using the model frequency response. Comparing the measured frequency response and the model frequency response may comprise comparing the normalised effective measured interface response and the normalised effective model interface response.

Comparing the measured frequency response and the plurality of modelled frequency responses according to the method may comprise comparing the phase of the measured frequency response and the plurality of modelled frequency responses.

The method may further comprise determining an echo window based on the reference reflection; and using the echo window to determine the length of the measurement reflection.

The method may further comprise trimming the measurement reflection to be the length of the echo widow, wherein the start of the trim is the start of the reference reflection.

The measurement ultrasonic signal according to the method may be a pulse signal.

The thickness of the measurement intermediate layer according to the method may be between 0.2 µm and 10 mm.

The frequency of the measurement signal according to the method may be between 20 kHz and 100 MHz.

The characteristic to be determined according to the method may be either the thickness of the measurement intermediate layer, or the substance of the measurement intermediate layer.

The method may further comprise mounting an ultrasonic transducer to the first layer of the multilayer structure.

The method may further comprise mounting the transducer to the multiple layer structure prior to transmitting a measurement ultrasonic signal into the first layer towards the measurement intermediate layer.

Further disclosed is an apparatus for determining a characteristic of a measurement intermediate layer in a multilayer structure using an ultrasonic transducer; comprising at least one controller configured to carry out the method set out herein.

BRIEF DESCRIPTION OF THE DRAWINGS

The invention will now be described, by way of example only, with reference to the accompanying drawings, in which:

FIG. 4(*a*) shows an example waveform of a reference reflection;

FIG. 4(*b*) shows an example waveform of a reflection comprising primary and secondary reflections;

FIG. 4(*c*) shows an example waveform of a reflection comprising overlapping primary and secondary reflections;

FIG. 4(*d*) shows an example waveform of a reflection comprising overlapping primary and secondary reflection;

DETAILED DESCRIPTION

It is possible to determine one or more properties of an intermediate layer of a multilayer structure using ultrasonic measurements, for example performed using an ultrasonic transducer. An ultrasonic transducer may be placed in proximity of a multilayer structure, transmit an ultrasonic signal into the multilayer structure, and receive a reflected signal for analysis. An advantage of ultrasonic measurements is that they can be used to analyse properties of solid, liquid, and gas materials. Examples of measurements of intermediate layer properties using an ultrasonic transducer include measuring the thickness of an oil film in bearings of machinery, measurements of wear in injection moulding machines, and measurements of temperature or pressure in situ. It will be appreciated that many other examples and applications will exist. Further, the general technique described herein may find application beyond ultrasonic interrogation. In particular, the techniques may utilise sound and vibration frequencies well below ultrasonic and below audible frequencies.

Figure 1:
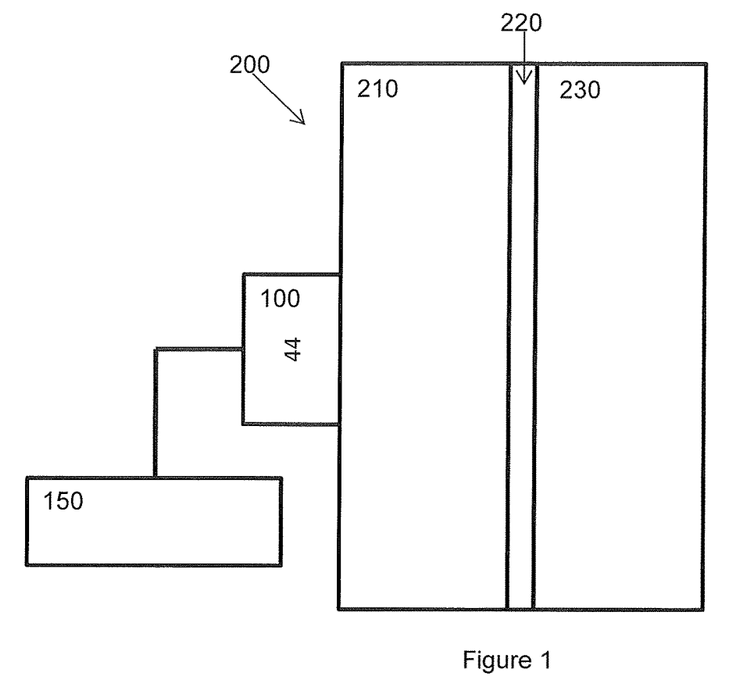
FIG. 1 is a schematic sectional view of a transducer installed on a multilayer structure.

FIG. 1 illustrates an ultrasonic transducer 100 placed in proximity to a multilayer structure 200. The ultrasonic transducer 100 may be contacted to the multilayer structure, for example, by attaching it using adhesive, a clamping arrangement, or other mechanisms holding the transducer 100 to the structure 200 so as to enable ultrasonic signals to travel between the transducer 100 and structure 200. The contact may be a removable attachment, or it may be a permanent attachment. In some implementations, ultrasonic signals (or vibrations of other frequencies) can be generated in a structure 200 without requiring attachment to that structure, for example using electromagnetic fields to stimulate vibration for generating ultrasonic waves in structure 200. For example, the vibrations may be set up using electromagnetic waves. The multilayer structure 200 comprises a first layer 210, to which the transducer 100 is proximate, an intermediate layer 220, and a third layer 230. The boundaries between the first layer 210, the intermediate layer 220, and third layer 230 are provided by an interface in which the two layers abut one another and are closely coupled. The interfaces are represented in FIG. 1 as straight and parallel to each other. However, other, non-straight and/or non-parallel boundaries between layers can also occur in multilayer structures. For example, the structure may form part of a curved component such as a barrel or bearing. Further, it will be appreciated that there may be more than three layers, and more than one intermediate layer. It will be appreciated that one or more further layers may be located between transducer 100 and first layer 210, and/or after the intermediate layer. The term first layer may be taken to be the layer in (direct) contact with the intermediate layer in the direction in which the ultrasonic energy originates.

In use, the transducer 100 may be connected to electronic systems and equipment 150, such as signal generators, signal processing equipment, signal analysers, visualisation equipment, etc. This electronic equipment may be used to generate an electric signal to be provided to transducer 100 and also include analysing equipment to process electric signals received from transducer 100, as is well known in the art.

The layers can be considered to each have a thickness which represents the dimension extending away from the outer surface into the layers. The outer surface may be taken to be the layer to which the transducer is attached, which may, in practice be an internal surface of a given component or object.

Figure 2:
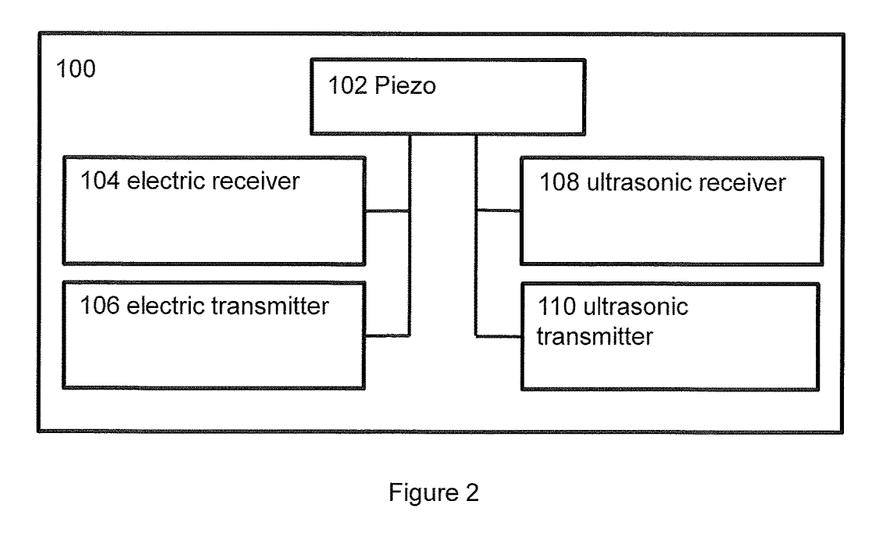
FIG. 2 is a schematic representation showing the basic constituent parts of a transducer.

FIG. 2 illustrates a schematic representation of an ultrasonic transducer 100, specifically a piezoelectric transducer. The transducer 100 comprises a piezoelectric element 102, able to convert electric signals into corresponding ultrasonic signals, and convert ultrasonic signals into corresponding electric signals. In order to achieve this, the transducer 100 may comprise: an electric receiver 104 configured to receive electric signals from an external source, which may be electronic systems and equipment 150; an electric transmitter 106 configured to transmit electric signals external to the transducer 100, for example to electronic systems and equipment 150; an ultrasonic receiver 108 configured to receive ultrasonic signals from an external source; and, an ultrasonic transmitter 110 configured to transmit ultrasonic signals external to the transducer 100. Conversion of electric signals to ultrasonic signals and vice versa is performed by a piezoelectric element 102. Parts of the electric and ultrasonic receiver and transmitter functions may be comprised within the piezoelectric element. Other parts of the receivers 104, 108 and transmitters 106, 110 may be comprised within connections to and from the transducer, for example electrically conducting wires for electric receiver 104 and transmitter 106, or for example the contacting arrangement contacting the transducer 100 to multilayer structure 200 got ultrasonic receiver 108 and transmitter 110.

The piezoelectric ultrasonic transducer illustrated in FIG. 2 and described above is presented as an example apparatus to generate, transmit, and receive ultrasonic signals. The skilled person will appreciate that methods other than a piezoelectric transducer exist to generate, transmit, and receive ultrasonic signals. Throughout the specification, it is understood that any mention of generation, transmission, or receipt of an ultrasonic signal may be taken to be achieved by such equivalent apparatus and methods.

Figure 3:
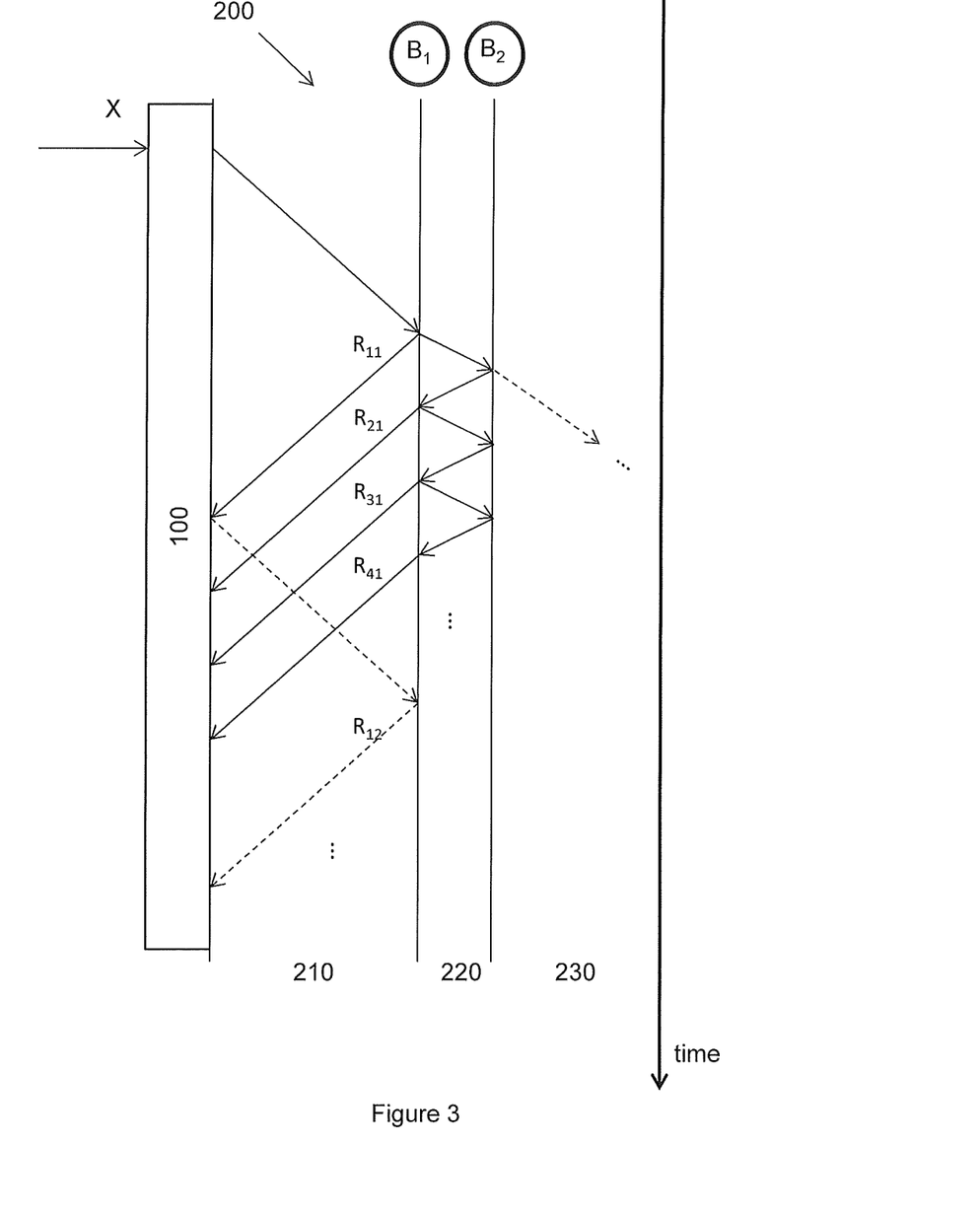
FIG. 3 shows a representational timeline of transmitted and reflected signals in a multilayer system.

FIG. 3 shows a representative timeline of an ultrasonic signal being transmitted and reflected inside a multilayer structure. An electric signal X, which may be referred to as the drive voltage, is received by the electric receiver 104 of the ultrasonic transducer 100 from a suitable signal generator. The transducer 100 converts the electric signal into an ultrasonic signal which is transmitted into multilayer structure 200. The ultrasonic signal propagates through the first layer 210 until it reaches the boundary surface $B_1$ between the first layer 210 and the intermediate layer 220. A part of the ultrasonic signal $R_{11}$ will reflect at the boundary surface $B_1$. In the notation of FIG. 3, $R_{AB}$ is the $A^{th}$ reflection contribution originating from the $B^{th}$ reflection or transmission off boundary surface $B_1$. Signals $R_{A1}$ may be referred to as signals originating from the first primary reflection or transmission. The subscript 1 indicates the reflection originates from the first transmission at first boundary surface $B_1$. R specifies that the signal relates to a reflected signal. A reflection off the first boundary surface may be referred to as a primary reflection.

A portion of the signal that is not reflected as part of $R_{11}$ is transmitted into and propagates through the intermediate layer 220, which may also be referred to as the measured intermediate layer. When reaching the second boundary surface $B_2$ between intermediate layer 220 and third layer 230, a portion of the signal is reflected off boundary surface $B_2$, and a portion propagates into the third layer 230. The reflected portion of the signal propagates back across the intermediate layer 220, and upon reaching boundary surface $B_1$, a portion $R_{21}$ is transmitted into the first layer for propagation back to the transducer 100. A reflected signal off the second boundary $B_2$ may be referred to as a secondary reflection. A portion is also reflected back into the intermediate layer, which may result in multiple reflections. The intermediate layer 220 may be significantly thinner than the first layer, in which case multiple reflections $R_{21}$, $R_{31}$, $R_{41}$, . . . , of the second boundary $B_2$ may reach the transducer 100 before a second reflection $R_{12}$ of the first boundary $B_1$ may be received by transducer 100. As described herein, only the first primary reflection and secondary reflections originating from the first primary transmission: $R_{11}$, $R_{21}$, $R_{31}$, $R_{41}$, . . . .

Propagation of the signals through the layers may be lossy, that is to say, part of the signal is lost in the material. In such case, the reflected portions $R_{AB}$ indicated in FIG. 3 may represent the reflected amount as described above, reduced by the amount lost during propagation, so that the portion $R_{AB}$ indicates the portion of the signal that is received by the ultrasonic receiver 110 of transducer 100.

The angle of the arrows representing an ultrasonic signals in FIG. 3 illustrate propagation of the signals over time The angles are not a representation of the angles at which a signal is incident and/or reflected. Incident, transmitted, and/or reflected angles of a signal may be perpendicular to the boundaries between the layers of the multilayer structure.

FIGS. 4(a)-4(d) illustrate example signals of reflected ultrasonic signals received by the transducer 100. The signals are represented in the time domain and are expressed in arbitrary units (AU). Although the signals represent reflected ultrasonic waves, the representations in FIGS. 4(a)-(d) may be determined from the electric signals which the ultrasonic signals were converted into and transmitted by the ultrasonic transducer 100.

Figure 4A:
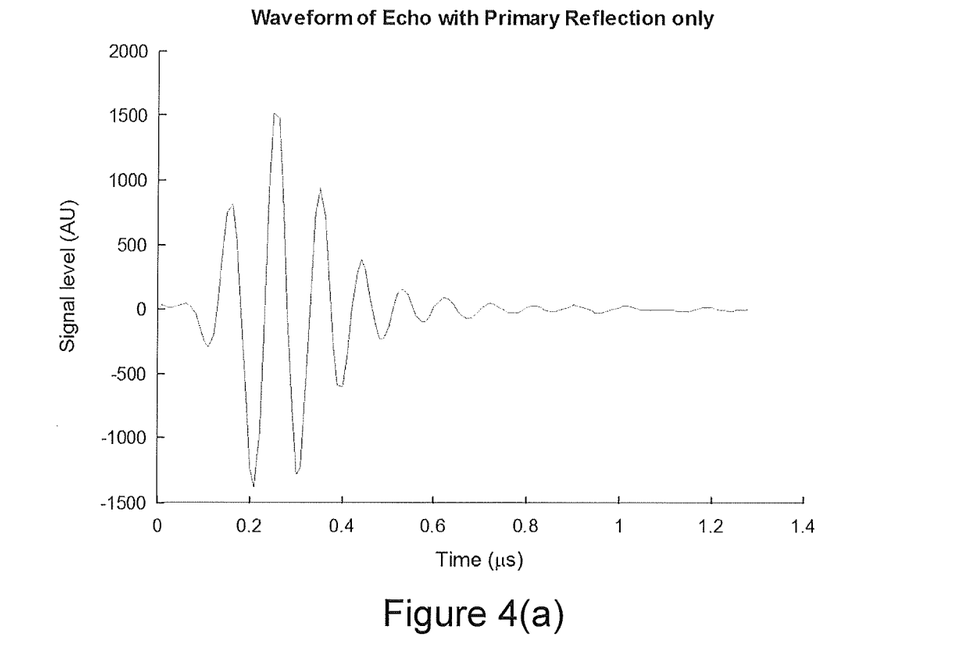

FIG. 4(a) represents a reference signal, comprising a signal reflected off boundary surface $B_1$. The reference signal of FIG. 4(a) does not comprise secondary reflections. This may be achieved for example by having an intermediate layer 220 with a thickness large enough relative to the length of the reference signal so that the secondary reflections of the reference signal are separated far apart in time from the primary reflection $R_{11}$. In other words it may be possible to state that the intermediate layer has a thickness large enough relative to the time duration of the signal energy component. In this example, the thickness of the intermediate layer is so that the first secondary reflection falls outside the time window shown in FIG. 4(a). The length of the time window is chosen so that, for a given thickness of first layer 210 as shown in FIG. 4(a), the second primary reflection falls outside the chosen time window. Noise signals may also be included in any of the signals illustrated in FIGS. 4(a)-(d).

Figure 4B:
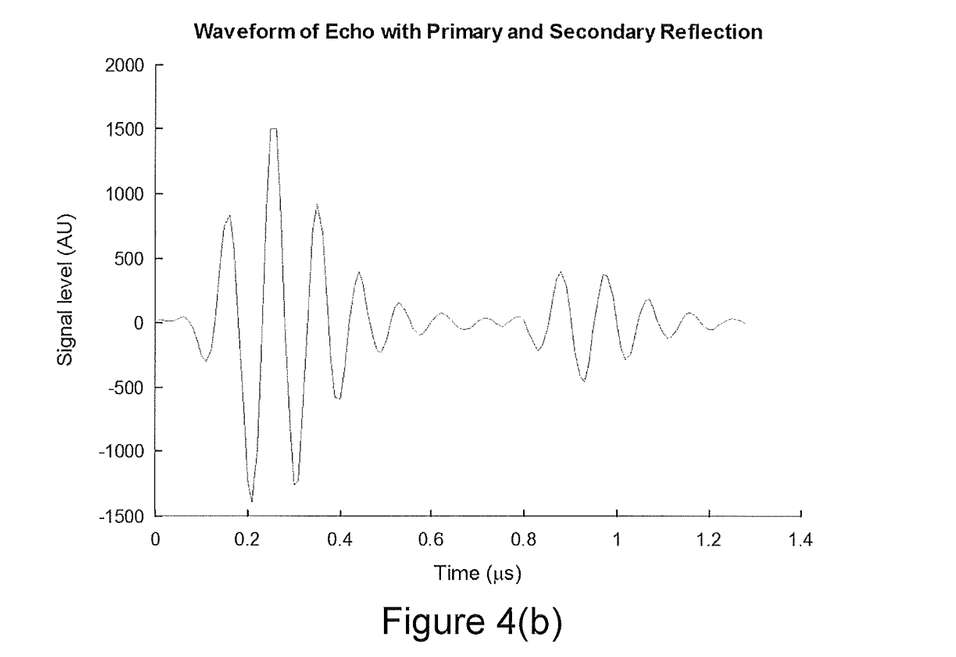

In FIG. 4(b) a reflected signal is shown comprising a primary reflection and a secondary reflection, which may be $R_{11}$ and $R_{21}$ shown in FIG. 3. In the setup of FIG. 4(b), the thickness of the intermediate layer 220 is small enough to include the secondary reflection signal in the time window shown in the signal of FIG. 4. The thickness may at the same time be large enough to separate the primary reflection and secondary reflection in time. The two reflections shown in FIG. 4(b) are distinguishable from each other in the time domain.

Figure 4C:
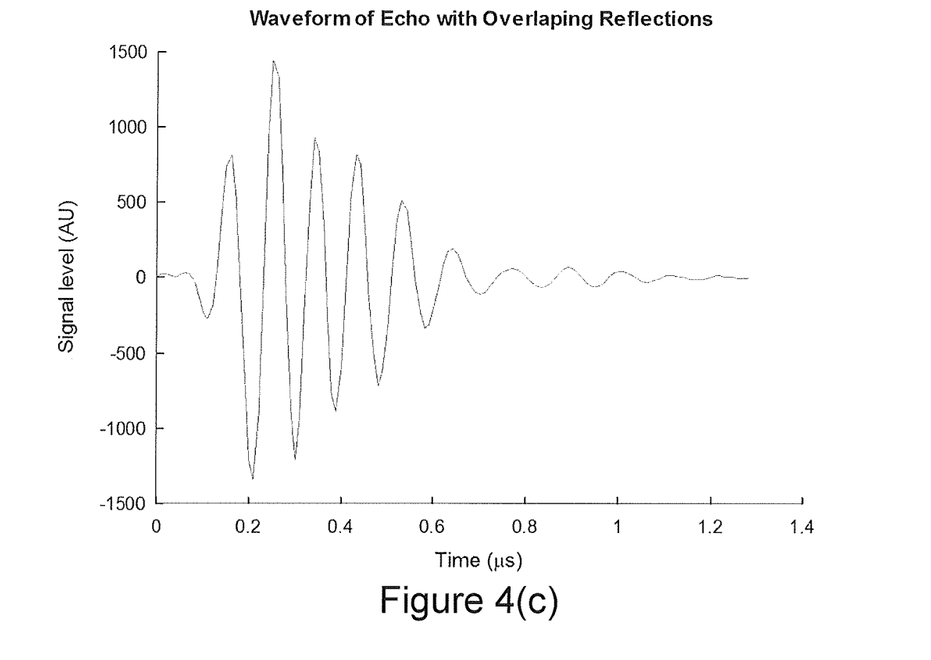
Figure 4D:
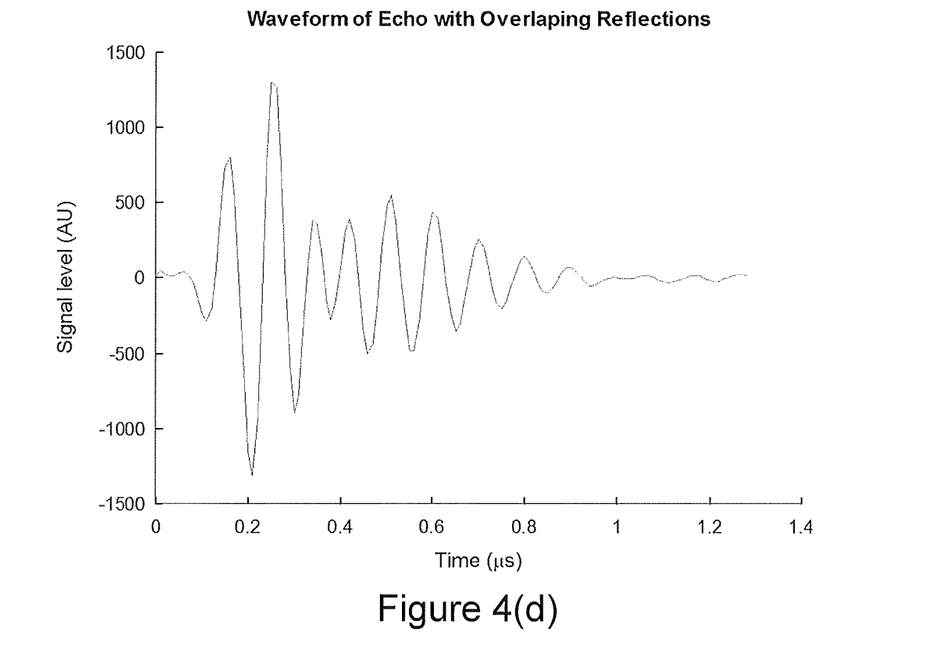

FIGS. 4(c) and 4(d) shows a reflected signal received by a transducer from a multilayer structure wherein the first reflection overlaps with one or more subsequent reflections. These reflections may comprise a plurality of $R_{11}$, $R_{21}$, $R_{22}$, etc. The different reflections are not straightforward to distinguish in the time domain.

Parameters other than the thickness may influence the separation or overlap in time of the different reflections in signals described in relation to FIGS. 3 and 4(a)-(d), including, for example, the propagation speed of the ultrasonic signal through the first layer 210 and intermediate layer 220, and the duration of the signal. A signal with a longer duration will be more spread out in the time domain, and will overlap with secondary reflections in more situations. The material comprised within the intermediate layer may determine the extent of overlap of the primary and secondary reflected signal. Specifically, the propagation speed of an ultrasonic signal in a material may determine how quickly the secondary reflection is returned into the first layer 210. Taking a first example structure wherein the intermediate layer 220 is formed of a first material, and a second setup substantially similar to the first example structure but wherein the intermediate layer 220 is formed of a different, second, material, the resulting reflected signal may differ. If the ultrasonic signal propagates faster in the first material of intermediate layer 220 compared to the second material, the separation in time of the primary and secondary reflection will be less in the first example comprising the first intermediate layer material.

Information regarding the properties of the different layers of multilayer structure 200, including the intermediate layer 220, may be obtained from the reflected signal received by the ultrasonic transducer 100. These may include information about, for example, a thickness or one or more material properties of the intermediate layer 220. It may not be possible to obtain some or all of such information to be obtained, from a signal comprising one or more overlapping signals where the different reflections are not distinguishable. As a result, using the above signals, it may not be possible to obtain information about intermediate with a small thickness leading to overlapping reflections. In order to be able to determine one or more properties of an intermediate layer resulting in a reflected signal comprising overlapping reflections, this specification discloses the methods as set out below.

Described herein is a method of determining a characteristic of a measurement intermediate layer 220 in a multilayer structure 200 using an ultrasonic transducer 100. The multilayer structure may include a first layer 210, a measurement intermediate layer 220 and a third layer 230 in series abutment. However, it will be appreciated that there may be a plurality of intermediate layers.

The method may comprise generating, by the ultrasonic transducer 100, a measurement ultrasonic signal to be transmitted into the first layer 210 so that the signal propagates towards the measurement intermediate layer 220. The method may further comprise measuring a measurement reflection, which is a measurement of the measurement ultrasonic signal reflected from the multilayer structure 200 back through transducer 100. This may be done by analysing an electric signal converted by the transducer 100 from a received ultrasonic reflected signal. The method may further comprise determining, using the measurement reflection, a measured frequency response of the measurement intermediate layer 220. The details of a method which may be used to determine the frequency response are provided further in this specification.

The method may also comprise determining a plurality of modelled frequency responses of the measurement intermediate layer 220. The measured frequency response may then be compared to the plurality of modelled frequency responses, and the characteristic of the measurement intermediate layer determined based on the comparison of the measured frequency response and the plurality of modelled frequency responses.

The characteristic to be determined may be the thickness of the intermediate layer, or a property of the material forming the intermediate layer, for example the substance of the measurement intermediate layer, which may be determined for example, from a determined impedance of the measurement intermediate layer. These characteristics may be determined from their relationship to a measured parameter, for example the propagation time of the ultrasonic wave through the measurement intermediate layer. The thickness of the measurement intermediate layer 220 of the multilayer structure may be between 0.2 μm and 10 mm. It will be appreciated that these measurements may be approximate and include any normal tolerances expected within the field of ultrasonic measurements. The thickness measurement results achieved using the methods and apparatus described herein are able to at least match the performance of other methods, such as capacitive measurements, or thickness measurements using lasers.

Substance may be taken to mean any of a material, solid, liquid, or gas. Each layer will likely be homogeneous so as to comprise a single substance uniformly distributed throughout the layer.

An advantage of performing the above analysis in the frequency domain is that noise present in a measured time domain signal to be analysed is spread across the different frequencies, which may decrease noise effects on the analysis. This can allow a broader range of thicknesses to be considered without the need for a broadband and data intensive analysis. Another advantage of performing the analysis in the frequency domain is that it enables the comparison to be performed across the entire time frame of the signal for each frequency. Another advantage of performing the analysis in the frequency domain is that less data storage may be required while still comprising data across the entire time frame of the signal, specifically in the case where the determined frequency responses are sampled.

The plurality of modelled frequency responses may be determined as values of a model frequency response comprising a variable, for example, a model frequency response function. Changing the variable/parameter, of a function may result in different output values of the model frequency response function. In other examples, the models may be derived empirically in which frequency response are obtained for a number of different models and the results sorted in a database which can be compared with the measured results.

Figure 6:
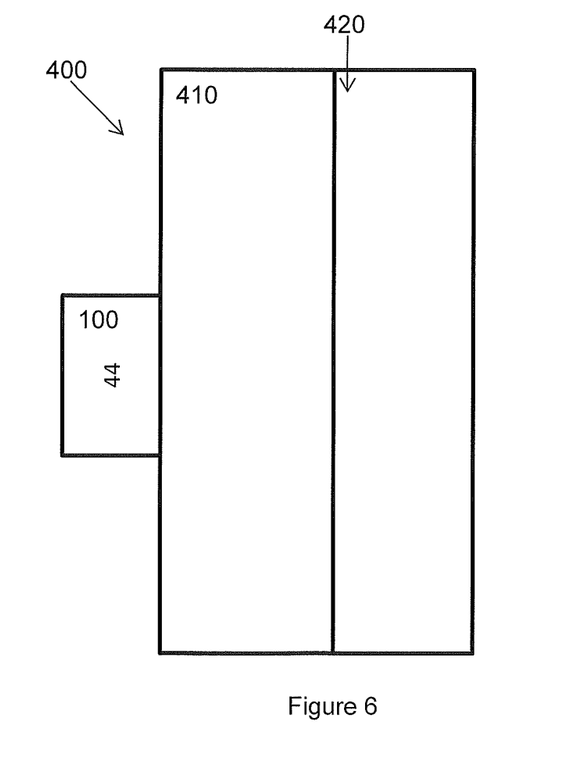
FIG. 6 is a schematic sectional view of a transducer on a reference structure.

The method may further comprise transmitting a reference ultrasonic signal, using a transducer 100 in a reference structure 400, as shown in FIG. 6. The reference structure may include a reference first layer 410 and a reference intermediate layer 420. The reference first layer 410 may be substantially identical to the first layer 210. Alternatively, the reference first layer 410 may be substantially different from first layer 210, with known characteristics, either absolute or relative to the first layer 210, so that a comparison can be made between the reference first layer 410 and the first layer 210. Similarly, the reference intermediate layer 420 has properties whose relationship is known relative to the measured intermediate layer 220. For example, the reference intermediate layer 420 and measurement intermediate layer 220 may consist of the same material.

The thickness of the reference intermediate layer 420 may be greater than the thickness of the measurement intermediate layer 220. The known relationship between the reference first layer 410 and the first layer 210, and the reference intermediate layer 420 and the measured intermediate layer 220 means that signals received from the reference structure 400 and multilayer structure 200 can be compared.

A reference reflection signal, also referred to as a reference reflection, of the reference ultrasonic signal on the reference structure may be measured, for example by transducer 100. This reference structure 400 may be used, along with the measurement reflection, to determine the measured frequency response of the measured intermediate layer. The reference ultrasonic signal for input into the reference structure 400 may be substantially identical to the measurement ultrasonic signal.

One or both of the generated measurement and reference ultrasonic signals may be a pulse signal, that is to say, a signal with a limited duration in time. The duration in time of the pulse signal may also be referred to as the length of the pulse. The length of the pulse may depend on properties of the transducer.

The reference signal may be reflected so that any secondary reflections are removed from the reference reflected signal. The reference intermediate layer 420 may have a front surface into which the reference ultrasonic signal is received, and a back surface, wherein the received reflected signal, for example at transducer 100, does not include any reflection from the back surface from the reference intermediate layer 420. This may be achieved by increasing the thickness of the reference intermediate layer, as illustrated in FIG. 6, so that any reflections off the back surface of the reference intermediate layer fall outside a time window considered for the received reflected signal at the transducer 100. Alternatively the lack of reference intermediate layer 420 back surface reflections may be achieved by other methods, including for example signal processing of the reflected signal to remove secondary reflections, providing an estimated reference signal. Other methods may include removing secondary reflections in another manner, for example by having a reference third layer which dampens any reflections off its surface, or a reference third layer absorbs ultrasonic signals incident on its surface and as a result removes reflected secondary waves, or by using a reference third layer having an acoustic impedance substantially the same as that of the intermediate layer. In other embodiments, the reference signal comprises one or more secondary reflections, and one or more of estimations or calculations are performed to remove these secondary reflections from the reference signal.

The reference structure may be provided from the multilayer structure 200, by making changes to the setup of the multilayer structure 200. It may be possible to increase the thickness of the intermediate layer by increasing the separation between the first layer and the third layer of the multilayer structure 200. This action may turn a measurement intermediate layer 220 into a reference intermediate layer 420, and in this more separated configuration the multilayer structure 200 becomes the reference structure 400. The intermediate layer may consist of a liquid or a gas filling the area between the first and third layer, which may fill the increased volume when the layer separation is increased.

It will be appreciated that an aim of the reference intermediate layer is to separate the primary reflection from any secondary reflections which reflect from the back side of the reference intermediate layer. In order to achieve this, the trailing edge of the input signal should ideally have left the interface boundary surface $B_1$ before the secondary reflections reach the interface. In order to remove secondary reflections from a reflected reference signal by increasing the intermediate layer thickness, the thickness of the reference intermediate layer may be at least as great as the width of the reference signal in the intermediate layer. In other words, the reference intermediate layer thickness for determining a reference signal may be at least as great as the width/length of the reference signal in the intermediate layer used to perform the reference measurement.

As is set out above, the reference reflection may not contain secondary reflections, and therefore the duration, which may also be referred to as length, of the primary reference reflection of the generated reference signal can be determined from the reference reflection. With reference to FIG. 3, this may be the duration of $R_{11}$. An echo window may be determined as a window of time comprising all of the first primary reflection $R_{11}$, and none of the second primary reflection $R_{12}$. Specifically, the echo window may be chosen to start at the start of the first primary reflection, and reach up to, but not include, the start of the second primary reflection $R_{12}$. In case the third layer has a third interface/boundary surface of which signals may be reflected, the echo window may further be determined to comprise all of the first primary reflection and none of a reflection of a third interface between third layer 230 and a fourth layer (not shown in FIG. 1), a first tertiary reflection. The echo window may be set to start at the start of the first primary reflection and be limited by the earlier of the second primary reflection or the first tertiary reflection.

One primary reflection has been found to be sufficient to determine the necessary characteristic with additional primary reflections not adding significantly more.

The echo window may also have a shorter length, while still comprising all of the first primary reflection. The echo window may be chosen to start at a point before the start of the first reflection. The echo window may be used to determine the length of the measurement reflection. The echo window may be used to trim a received measurement reflection across a time frame. The received measurement reflection may be trimmed for example, from the start of the first primary reflection, to the end of the echo window, to have the same length as the reference reflection.

In order to generate and reflect an ultrasonic pulse from a structure, a transducer 100 may be mounted to that structure. A transducer 100 may be mounted to the first layer 210 of the multilayer 200. Similarly, a transducer 100 may be mounted to reference first layer 410 of reference structure 400. The transducer mounted to the reference 400 and multilayer 200 structures may be the same transducer 100, or a substantially identical transducer. The use of the same or identical transducer 100 enables the method to obtain reference and measurement signals under substantially similar measurement conditions.

In practice, the reference structure may be the same as the measurement structure with the third layer removed or the moved away by a sufficient amount, as described above. Thus, a user may mount a transducer to the multilayer structure and collect the necessary measurement data. The user may then increase the thickness of the intermediate layer by a sufficient amount and collect necessary reference measurement data. These two steps could be done in reverse, with the reference measurement data collected prior to the third layer being located in the correct operational position which is required to be measured.

A measured frequency response may be determined for the reference reflection and the measurement reflection. Prior to determining the frequency response, the measurement and reference reflections may be filtered to maximise the signal to noise ratio. The method may include a filtering technique. The filtering technique, which may be a matched filtering technique, may include autocorrelation and cross-correlation processes to increase the signal to noise ratio.

The method for determining the measured frequency response may comprise calculating an autocorrelation of the reference reflection. It may comprise calculating a cross-correlation of the reference reflection and the measurement reflection. Both of the calculated autocorrelation and cross-correlation may be performed in the time domain, wherein the reference reflection and the measurement reflection are both expressed as a function of time.

The method may further comprise calculating a frequency domain transform of the reference reflection and measurement reflection. The frequency transform may comprise a Fourier transform, a discrete Fourier transform, or a Fast Fourier Transform. The frequency transform may comprise the application of a Goertzel filter, for calculating the Discrete Fourier Transform for one or more individual frequencies, a direct frequency domain measurement or any other suitable technique which can provide the measured signal(s) in the frequency domain. The frequency domain transform may be carried out after the autocorrelation and of the cross-correlation. The method may further comprise dividing the frequency transform of the cross-correlation by the frequency of the autocorrelation.

The method for determining a characteristic of a measurement intermediate layer may comprise a step of comparing the measured frequency response to a plurality of modelled frequency responses. The comparison may comprise a comparison of the phase of the measured frequency response to the phases of the plurality of modelled frequency responses. A comparison of the phases of the signals may be more responsive and indicative of differences between signals than an amplitude comparison. Phases may provide a better indicator of the propagation time through the system and layer thickness, as the absolute phase of a signal depends on the propagated distance through the layer. Phase measurements may also be less noisy than amplitude measurements, making them a more stable measurement to compare in the methods disclosed herein. The phase of a measured frequency response, including of a normalised effective measured or model interface response can be easier to compare to a model response.

The comparison of measured and modelled frequency responses may comprise the calculation of a normalised effective measured interface response based on the determined measured frequency response. The method may further comprise determining a normalised effective model interface response for each of the plurality of modelled frequency responses. Each of the normalised effective model interface responses may be calculated from the corresponding modelled frequency response. The method may subsequently include comparing the normalised effective measured interface response and the normalised effective model interface response, as a way of comparing the modelled frequency response to the measured frequency response. The comparison of the normalised effective measured and model interface responses may comprise the comparison of one or both of the phase and amplitude of the normalised effective frequency responses.

The measurement signal may be a broadband signal. Alternatively, the measurement signal may be a signal comprising a band of frequencies. For example, the signal, which may be a pulse signal, may consist of a portion or all of the frequencies between, and including, 20 kHz and 100 MHz. The broadband signal may comprise a peak resonance frequency of the ultrasonic transducer and one or one or more further resonance frequencies of the ultrasonic transducer. The broadband signal may further comprise noise components. In one example, the frequency band of the transducer may be between 5 MHz and 15 MHz, or 2 MHz to 5 MHz, or 6 MHz to 12 MHz which are commonly used frequencies within the art. It will be appreciated that the transducer may only produce useful ultrasonic waves at given frequencies within those bands.

In the following paragraphs, exemplary methods and calculations are used to determine a characteristic of the measured intermediate layer 220 are set out in more detail. A method for determining a characteristic of an intermediate layer between two materials, referred to as a first and third layer, using two ultrasonic pulses, and described herein is a Total Acoustic Processing Technique, or TAPT.

The characteristic can be the thickness of the intermediate layer 220, identification of the substance forming the intermediate layer through determination of one or more of its material properties. The method uses a pulse signal impinging on the interface of the first layer and the intermediate layer. The pulse signal may have a distinct profile, with regards to properties including but not limited to frequency, amplitude, and duration. The method may be based on the determination and analysis of a linear time invariant system model of the multilayer structure. The model may be derived from a ray model heuristic of ultrasonic propagation, wherein the model may assume perfectly flat interfaces between layers in the multilayer structure. The model may also assume one-dimensional ultrasonic propagation. The method using the steps described above can be used to calculate the propagation time of an ultrasonic pulse signal through the measured intermediate layer.

The model may comprise a parameter, sometimes referred to as a variable, which can assume different values to result in different model frequency response outputs. The parameter may be the propagation time of the ultrasonic pulse signal through the intermediate layer. The model outputs for different propagation times are compared to a measured reflection, and the closest match is determined, and the corresponding propagation time is selected. If the material properties, including propagation speed of sound in the material of the intermediate layer are known, the thickness of the intermediate layer can be determined from the propagation time and the speed of sound in the material. Similarly, if the thickness and the propagation time are known, the speed of sound in the material can be determined, and from it one or more material properties, for example material impedance, or identification of the material.

In one method, a reference reflection and a measurement reflection are measured, in order to determine a frequency response characteristic of the system, which may specifically be a frequency response of the intermediate layer interface. In an ideal case, the ultrasonic pulse signals used would have a broadband ultrasonic source, so that the entire frequency response can be characterised based on the measurement. However, use of a broadband source for characterisation may in practice be unfeasible. A transducer 100 generating a coherent signal with a narrower bandwidth, for example 6 MHz to 12 MHz, can be used to obtain an estimation of the broadband frequency response of the intermediate layer that is sufficiently accurate to obtain usable propagation time estimations for determining thickness or material properties. Example transducer bandwidths include 6 MHz to 12 MHz, 3 MHz to 5 MHz, 5 MHz to 15 MHz, and 200 kHz to 600 kHz, or another frequency range between 20 kHz and 100 MHz. The upper limit of the measurement signal frequency range may determine the lower limit of thickness to be measured. The lower limit of the measurement signal frequency range may determine the upper limit of thickness to be measured.

Figure 5:
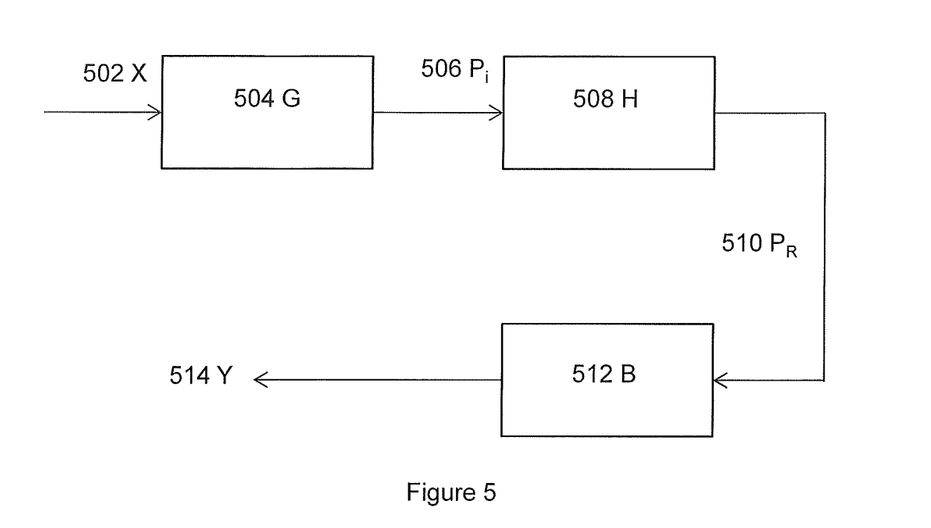
FIG. 5 shows a system block diagram representing the frequency responses of different elements acting on a signal propagating through a multilayer structure.

FIG. 5 illustrates a system blockflow diagram illustrating a signal representation of the signal chain from the input drive voltage X to output signal Y. Illustrated in FIG. 5 are three subsystems affecting a signal, the first is G, the system impulse response 504, representing how the signal is affected by transduction, the electrical and mechanical dynamics of the transducer 100 affecting the signal, impact of cables and connecting structures. G further comprises effects of propagation of the ultrasonic signal to the edge of intermediate layer, where pressure wave $P_i$ 506 is incident. Interface response H 508 represents the effects of the intermediate layer 220 on the signal $P_i$. The signal reflected back from the intermediate layer is $P_R$ 510. The effect of propagation back to transducer 100, contributions of the transduction, cables, connecting structures, and any further equipment, for example amplifiers, or filters, working on the reflected signal are comprised within reverse transduction response B 512. For measurement performed on output from the transducer 100, only digitised signal Y 514 can be accessed, wherein Y can be expressed as a multiplication of the signals:

$$Y = X \cdot G \cdot H \cdot B$$

If the reference structure 400 has a known relationship to multilayer structure 200, so that either reference 410 and multilayer first layer 210 are identical, or have a known relationship, and if the same or identical transduction setups are used, as well an identical drive voltage X or drive voltage signals X with a known relationship, the effects of system impulse response G and reverse transduction response B on the drive voltage X, can be cancelled out in a comparison of a reference signal $Y_0$ and a measurement signal $Y_m$. As a result a comparison of a reference signal and a measurement signal can isolate the effects of the interface response H of the intermediate layer. Interface response H comprises data regarding the properties of the intermediate layer, and may be used to determine a characteristic of the intermediate layer 210.

Figure 7:
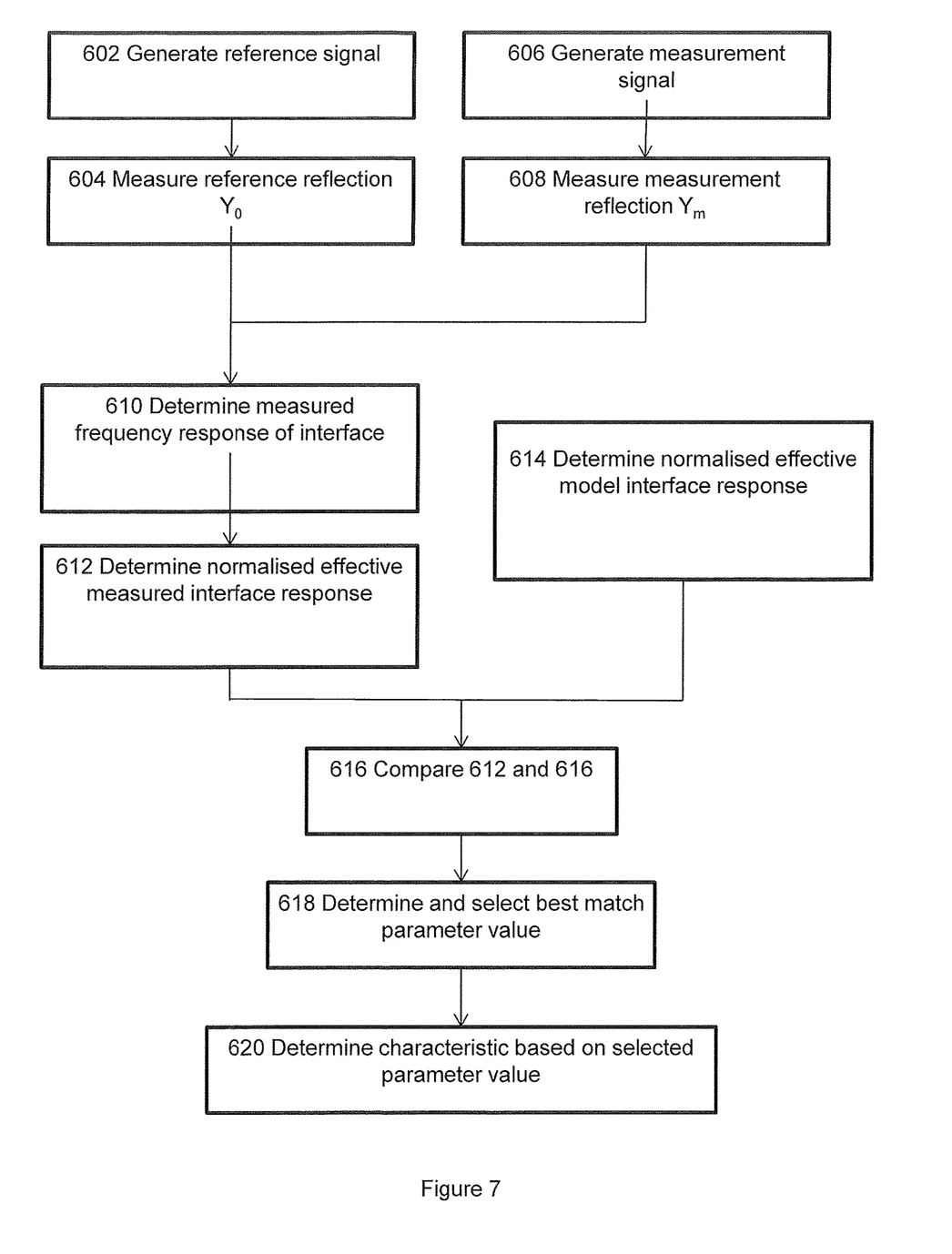
FIG. 7 is a flow diagram of the different steps in a method of determining a characteristic of an intermediate layer in a multilayer structure.

FIG. 7 illustrates an overview of the different steps in a method for obtaining a comparison of reference and measurement signals to determine an interface response of an intermediate layer, and further steps to analyse this response to obtain the characteristic to be determined. In step 602 a reference signal is generated for propagation through a reference structure 400 with properties as described above, so that no secondary reflections are comprised within reference reflection $Y_0$. In step 604 the reference reflection $Y_0$ is measured. In step 606 a measurement signal is generated and propagated through multilayer structure 200 comprising measurement intermediate layer 220. The measurement reflection $Y_m$, which may comprise secondary reflections off the back surface forming the edge between the intermediate and third layer is measured in step 608.

As described in relation to FIG. 5 above, step 610 comprises the determination of a measured frequency response based on a comparison of $Y_0$ and $Y_m$, to cancel out the effects of G, B, and X on the signals $Y_0$ and $Y_m$.

In an exemplary embodiment, this may be achieved by taking the signals obtained in the time domain, $y_0(t)$ and $y_m(t)$, optionally with an echo window trim applied to select the part of the time domain signal to be used in the comparison and analysis. Subsequently an autocorrelation of the reference time-domain signal may be calculated as:

$$r_{00}(\tau) = \int_{-\infty}^{+\infty} y_0(t)y_0(t+\tau)dt$$

A cross-correlation of the reference time-domain signal $y_0(t)$ and the measured time-domain signal $y_m(t)$ can further be calculated as:

$$r_{0m}(\tau) = \int_{-\infty}^{+\infty} y_0(t)y_m(t+\tau)dt$$

Using an autocorrelation and a cross-correlation has an advantage of smoothing the reference signal and measurement signal, respectively. The autocorrelation and cross-correlation may have a matched filter functionality, that is to say, it may increase signal-to-noise ratio of the signal $y_0(t)$ by enhancing the signal contributions to $y_0(t)$ and attenuating the noise contributions to $y_0(t)$.

The obtained correlated signals $r_{00}(\tau)$ and $r_{0m}(\tau)$ are transformed into the frequency domain, for example using a Goertzel filter, or a Fast Fourier Transform (FFT), becoming $R_{00}$ and $R_{0m}$:

$$R_{00}(f) = \mathcal{F}[r_{00}(\tau)]$$

$$R_{0m}(f) = \mathcal{F}[r_{0m}(\tau)]$$

An advantage of transforming the signals to the frequency domain is that time-domain noise is spread across all frequencies. Noise reduction through use of correlation functions and transformation to the frequency domain increases the precision that can be achieved by the method. This allows the method to measure layer thicknesses over a wide range, for example from 0.2 µm to 10 mm without requiring adjustments to the measurement setup. Another advantage of working in the frequency domain is that it may decrease the amount of storage and calculation power required. In the time domain, each point of the digitised signal provides information about the signal, so the entire signal needs to be stored and used in calculations. In comparison, working in the frequency domain, each frequency comprises information of the entire time domain, and the frequency signal may be a sampled signal, requiring significantly less data points to be stored. As an example, a time signal may comprise 500 measurement points, and the corresponding sampled frequency domain may comprise 10 sampled frequencies. The reduction in data points may lead to faster data processing, and needs less storage memory and computing power.

In an example disclosed herein a sampling frequency of 100 MHz can be achieved by transducer 100, which means a Fourier Transformed signal in the range of 0-50 MHz can be achieved, according to the Nyquist theorem. It has been determined by the inventors that a range of 6-12 MHz can obtain a usable signal, so the ranges that can be obtained by the method and apparatus as set out above, are sufficient to achieve results. A Discrete Fourier Transform (DFT) may be used to transform the signal. The sampling frequency may be chosen to overlap with some or all of the resonance frequencies of the ultrasonic transducer measurement signal.

In step 610 of the method, the measured frequency response of the intermediate interface is determined by dividing the frequency domain transformed cross-correlation of the measurement reflection $R_{0m}$ by the frequency domain transformed auto-correlation of the reference reflection $R_{00}$.

$$H(f) = \frac{R_{0m}(f)}{R_{00}(f)}$$

In the case the portion of the reference structure 400 leading up to the intermediate layer is identical to the corresponding part in the multilayer structure 200, the division cancels out the influence of the transducers 100, front layers 210, 410, and remaining elements of the measurement setup. If the setup of the reference structure 400 is not identical to the multilayer structure 200, but the relationships between the structures are known, additional calculations may be required to cancel out the terms unrelated to the intermediate interface response.

The above determination of the measured frequency response may be an estimation, for example because the signal used for the measurements was not a broadband signal and therefore does not characterise the full frequency response of the intermediate interface.

As is set out above, the phase of the determined measured frequency response H of the intermediate layer may be used for the analysis of the intermediate layer characteristics. A normalised effective measured interface response may be determined as H−1, in step 612 of FIG. 7.

In order to obtain information from this normalised effective measured interface response, it can be compared to a parametrised model, wherein the parameter may represent a variable related to the characteristic to be determined. For example, the parameter may be the propagation time of the ultrasonic signal inside the intermediate layer.

A normalised effective model frequency response may be determined theoretically in step 614 of FIG. 7, based on reflection and transmission equations and known material properties of the multilayer structure. An advantage of determining the characteristic using the method described herein is that no modelled or estimated signal is required, and instead the model is of an interface response, which can be based on well-understood reflection and transmission equations for the material.

The comparison of the model and measured frequency responses may comprise a comparison of the phases of the responses. The modelled phase of the normalised effective model frequency response may be determined as:

$$\overline{U} = \pi(\text{sgn}((Z_2-Z_1)(Z_2-Z_3))-1)/2+\text{atan } 2(\sin(4\pi fT), \\
((Z_2-Z_1)(Z_2-Z_3))/((Z_2+Z_1)(Z_2+Z_3))e^{-2\gamma f^{\eta}cT}-\cos \\
(4\pi fT))$$

In the above model, $Z_1$, $Z_2$, and $Z_3$ represent the acoustic impedances of the first 210, intermediate 220, and third layer 230 of the multilayer structure 200, respectively. T is the propagation time, η is the attenuation frequency dependence exponent, γ is the attenuation of the intermediate material, and c is the speed of sound in the intermediate layer 220. In the above equation, all properties except the frequency and propagation time can be determined when the materials of the multilayer structure are known. The frequency can be determined from the input signal and transducer behaviour. As a result, the propagation time may be a parametrised value of the above model.

The phase of the normalised effective measured frequency response may be determined from H−1:

$$U(f) = \measuredangle(H(f)-1)$$

In step 616 of FIG. 7, the model and measured interface responses are compared. This comparison may be a comparison of the phases of the measured, U(f), and model, $\overline{U}$, responses. The comparison may comprise comparing the phase of the measured response U(f) to a model phase of $\overline{U}$ for different values of propagation time T. The value of T that results in the closest match between the modelled and measured phase of the normalised effective interface responses can be chosen as the determined propagation time in step 618:

$$\underset{0<T\leq T_m, f_0<f\leq f_m}{\text{argmax}} V(\overline{U}, U)$$

Wherein V is the function used to test for similarity. To limit computational power required, limits can be set for considered propagation times between 0 and Tm, wherein Tm is a predetermined value representing corresponding to the expected propagation time through an intermediate layer with a maximum expected thickness. The considered frequency range $f_0$ to $f_m$ is determined by the frequencies to which the transducer is sensitive. A frequency ranges within 12 dB of the peak frequencies of the transducer may be preferable. The frequencies to be modelled may also be determined by the frequencies for which sampled measurement interface responses are available. The modelled values of propagation time and frequency may be continuous within the determined ranges, or may be discrete values within those ranges. In case discrete propagation time and/or frequency values are chosen, additional or alternative values can be added to improve and optimise which of the modelled values achieved the most similarity to the measures signal.

One example function V evaluates the phase similarity by representing the phase angle in a complex number with a magnitude equal to one and the same phase, and taking a product of the complex conjugate of the normalised effective measured interface response $U_j$ and the normalised effective model interface response $\overline{U}_j$, for a set propagation time T, wherein each j represents a different frequency. The product is divided by the number of compared frequencies n, and the real part of the result is taken to be the output of function V. The propagation time resulting in the highest value of V is determined to be the best match, resulting in the most similar model output compared to the measured response. For a perfect match between U and $\overline{U}$, V will be 1.

$$V = \text{Re}\left[\frac{1}{n}\sum_{j=1}^{n} U_j^* \cdot \overline{U}_j\right]$$

In another example, the products of the phases are weighted by adding a weighting factor. This modulates the weight each product brings to the contribution to V. The weights $W_j$ may reflect the amplitude of the measured signal for that frequency, for example, so that the more prominent frequencies in the signal have a stronger influence in the comparison of the model and the measured responses.

$$V = \text{Re}\left[\frac{1}{n}\sum_{j=1}^{n} W_j \cdot U_j^* \cdot \overline{U}_j\right]$$

Weights $W_j$ may be determined from a frequency magnitude profile of the reference reflection, for example $|R_{00}(f)|$. The weight may represent the proportion of the total signal energy comprised within that frequency. An example calculation for the weight values $W_j$ may be:

$$W_j = \frac{|R_{00}^j(f)|}{\sum_{j=1}^{n}|R_{00}^j(f)|}$$

Once the selected propagation time $T_{select}$ that best matches the phase of the normalised effective measured interface response is determined, it can be used I step 620 to determine the thickness of the intermediate layer, as:

$$d = cT_{select}$$

Wherein d is the determined thickness, and c is the speed of sound in the intermediate layer 220.

In an embodiment where the thickness of the intermediate layer is known, but not the material, the above method can be used, instead parametrising the variables linked to intermediate layer material. These parameter valued could then be varied to correspond several potential materials, in order to try and find a best match to determine the material.

In the above described embodiment, the reference reflection and the measurement reflection undergo auto-correlation and cross-correlation respectively. These are then transformed into the frequency domain. The measured frequency response of the intermediate interface is determined by dividing the frequency domain transformed cross-correlation of the measurement reflection $R_{0m}$ by the frequency domain transformed auto-correlation of the reference reflection $R_{00}$. The phase may then be determined from the normalised effective frequency response which is used to determine the layer thickness.

An alternative for determining the frequency response of the system is to carry out a subtraction of the reference reflection from the measurement reflection. A cross correlation can be performed between the subtracted reflections and reference reflection prior to transforming the correlation into the frequency domain, using, for example, a FFT. Hence:

$$v(t) = Y_m(t) - y_0(t)$$

$$u_{vy}(r) = (v * y_0(t))(\tau)$$

$$u_{vy}(f) = F[U_{vy}(\tau)]$$

Where v is the subtracted reflection, $y_m$ is the measurement reflection, $y_0$ is the reflection, and $U_{vy}(f)$ is the signal response.

This alternative method of determining the frequency response is advantageous as the correlation and subsequent FFT of the reference reflection is no longer required, and there is no requirement for the division of the transformed correlations. Hence the computational burden can be reduced.

Figure 8:
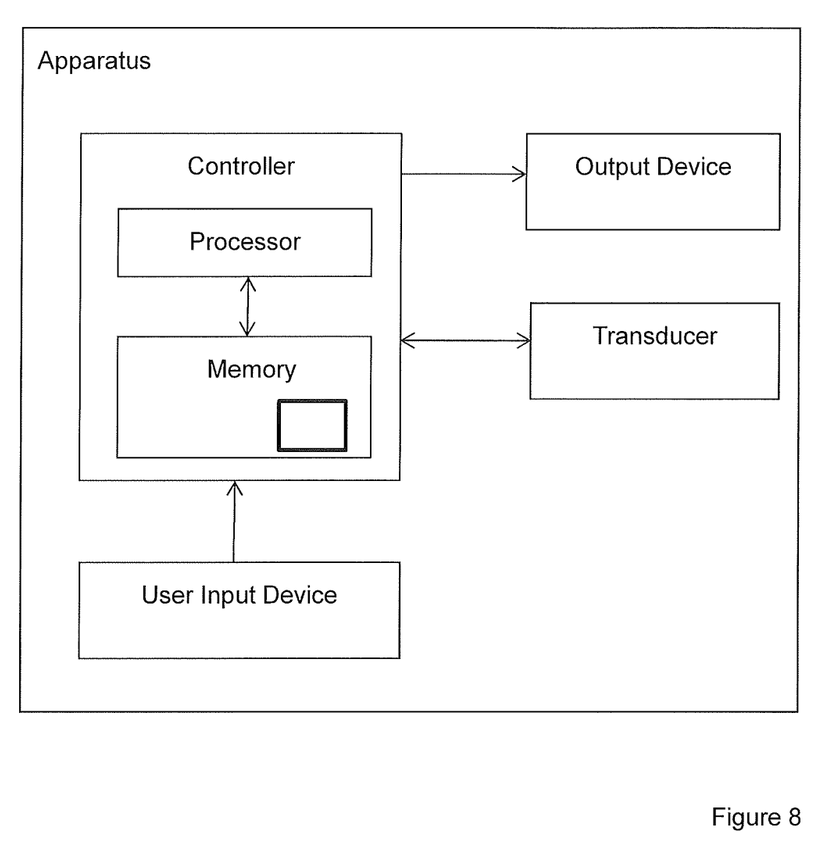
FIG. 8 is a schematic representation of an apparatus which may be used to carry out the method.

FIG. 8 illustrates a schematic diagram of an apparatus according to various examples. The apparatus may be the apparatus 150 described above and illustrated in FIG. 1. The apparatus may generally include electronic systems and equipment, such as signal generators, signal processing equipment, signal analysers, visualisation equipment, etc. The apparatus may be used to generate an electric signal to be provided to transducer 100 and also include analysing capabilities for processing the electric signals received from transducer 100, using the method described above and others known in the art.

The apparatus may include a controller, a user input device, and an output device. In some examples, the apparatus may be a module. As used herein, the wording 'module' refers to a device or apparatus where one or more features are included at a later time and, possibly, by another manufacturer or by an end user. For example, where the apparatus is a module, the apparatus may only include the controller, and the remaining features may be added by another manufacturer, or by an end user.

The apparatus may also be considered to include the transducer in some instances. However, the apparatus may be used remotely to the transducer and multilayer structure which is being interrogated.

The controller, transducer, the user input device, and the output device may be coupled to one another via a wireless link and may consequently comprise transceiver circuitry and one or more antennas. Additionally or alternatively, the controller, the user input device and the output device may be coupled to one another via a wired link and may consequently comprise interface circuitry (such as a Universal Serial Bus (USB) socket). It should be appreciated that the controller, the transducer, the user input device, and the output device may be coupled to one another via any combination of wired and wireless links. The controller may receive data from the transducer via a wired link, a wireless link, and possibly via a transportable memory device.

The controller may comprise any suitable circuitry to cause performance of the methods described herein. The controller may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. The controller may have multiple input/output channels. There may be up to sixteen input/output channels.

In various examples, the controller may comprise at least one processor and at least one memory. The memory may store a computer program comprising computer readable instructions that, when read by the processor, causes performance of the methods described herein. The computer program may be software or firmware, or may be a combination of software and firmware. The memory may additionally store one or more databases or functions required for executing the computer program.

The controller may be configured to carry out all of the necessary steps for executing the method. Thus, the processor may be configured to do any or all of: generate the driving signal for the transducer; receive the reflected measured and/or reference reflection signals; filter the measured and/or reflection signals; generate and/or store the modelled frequency responses; generate and/or store the model frequency response; carry out the frequency domain transformations; calculate the normalised effective measured interface response using the measured frequency response; determine a normalised effective model interface response using the model frequency response; and compare the normalised effective measured interface response and the normalised effective model interface response; compare the measured frequency response and the model frequency response; compare the phase of the measured frequency response and the plurality of modelled frequency responses.

The controller may comprise at least one output channel and one input channel. The output and input channels may send and receive electrical signals to and from the transducer. An output electrical signal may include the measurement ultrasonic pulse and/or the reference ultrasonic pulse. An input electrical signal may include the reference reflection and/or measurement reflection received from the transducer.

The controller and/or processor may be distributed amongst different apparatus. Thus, the apparatus may or may not represent a single unit provided in one location. For example, some of the data provided in the one or more electrical signals transmitted by the transducer may be sent to a remote location for signal processing or other steps of the method. The model of the frequency response may be created elsewhere and stored in the memory for use by the processor in the comparison of the measured frequency response and model frequency response.

The processor may include at least one microprocessor and may comprise a single core processor, may comprise multiple processor cores (such as a dual core processor or a quad core processor), or may comprise a plurality of processors (at least one of which may comprise multiple processor cores).

The memory may be located within a single unit within a controller. Alternatively or additionally, the memory may be distributed. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card). The memory may include: local memory employed during actual execution of a computer program used to carry out part or all of the method; bulk storage; and cache memories which provide temporary storage of at least some computer readable or computer usable program code to reduce the number of times code may be retrieved from bulk storage during execution of the code.

The computer program used to execute the methods described herein may be stored on a non-transitory computer readable storage medium. The computer program may be transferred from the non-transitory computer readable storage medium to the memory. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory via a wireless signal or via a wired signal.

Input/output devices may be coupled to the system either directly or through intervening input/output controllers. Various communication adaptors may also be coupled to the controller to enable the apparatus to become coupled to other apparatus or remote printers or storage devices through intervening private or public networks. Non-limiting examples include modems and network adaptors of such communication adaptors.

The user input device may comprise any suitable device for enabling an operator to at least partially control the apparatus. For example, the user input device may comprise one or more of a keyboard, a keypad, a touchpad, a touchscreen display, and a computer mouse. The controller is configured to receive signals from the user input device.

The output device may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller is arranged to provide a signal to the output device to cause the output device to convey information to the user.

It should be appreciated that the methods described herein may be performed 'offline' on data which has been measured and recorded previously. Alternatively it may be performed in 'real-time', that is, substantially at the same time that the data is measured. In this case, the controller may be coupled to the transducer either wirelessly or wired.

Although the description above refers to an ultrasonic transducer, it is understood that the above method and systems also applies to transducers partially or wholly operating outside the ultrasonic range, for example using one or more frequencies from the 1 Hz-20 kHz range.

It will be understood that the invention is not limited to the embodiments above-described, and that various modifications and improvements can be made without departing from the concepts described herein. Except where mutually exclusive, any of the features may be employed separately or in combination with any other features, and the disclosure extends to and includes all combinations and sub-combinations of one or more features described in them.

The invention claimed is:

1. A method of determining a characteristic of a measurement intermediate layer in a multilayer structure using an ultrasonic transducer, wherein the multilayer structure includes a first layer, a measurement intermediate layer and a third layer in series abutment, the method comprising:
   transmitting a measurement ultrasonic signal into the first layer towards the measurement intermediate layer;
   measuring a measurement reflection of the measurement ultrasonic signal from the multilayer structure;
   generating a reference ultrasonic signal in a reference structure, the reference structure including a reference first layer and a reference intermediate layer, the reference intermediate layer having a front surface into which the reference ultrasonic signal is received and a back surface;
   measuring a reference reflection of the reference ultrasonic signal on the reference structure, the reference signal being reflected so that any secondary reflections from the back surface are removed from the reference reflected signal;
   determining, using the measurement reflection and the reference reflection, a measured frequency response of the measurement intermediate layer;
   determining a plurality of modelled frequency responses of the measurement intermediate layer;
   comparing the measured frequency response to the plurality of modelled frequency responses;

determining the characteristic of the measurement intermediate layer based on the comparison of the measured frequency response and the plurality of modelled frequency responses; and adjusting the multilayer structure to provide the reference structure by increasing the separation of the third layer and the first layer to increase the thickness of the measurement intermediate layer prior to sending the reference signal.

2. A method according to claim 1, wherein the plurality of modelled frequency responses are provided by a plurality of values of a model frequency response.

3. A method according to claim 2, further comprising:
calculating a normalised effective measured interface response using the measured frequency response;
determining a normalised effective model interface response using the model frequency response; and
wherein comparing the measured frequency response and the model frequency response comprises comparing the normalised effective measured interface response and the normalised effective model interface response.

4. A method according to claim 1, wherein the reference ultrasonic signal is identical to the measurement ultrasonic signal.

5. A method according to claim 1, wherein the measurement reflection and reference reflection are filtered prior to performing a frequency domain transformation.

6. A method according to claim 5, wherein the filtering comprises a matched filtering technique.

7. A method according to claim 6, wherein the matched filtering technique comprises:
calculating an autocorrelation of the reference reflection; and
calculating a cross-correlation of the reference reflection and the measurement reflection.

8. A method according to claim 7, wherein determining the measured frequency response comprises:
calculating frequency domain transforms of the autocorrelation and of the cross-correlation; and
dividing the frequency transform of the cross-correlation by the frequency transform of the autocorrelation.

9. A method according to claim 1, further comprising subtracting the reference reflection from the measurement reflection to provide a subtracted reflection and cross correlating the subtracted reflection.

10. A method according to claim 9, wherein determining the measured frequency response comprises obtaining a frequency domain transform of the subtracted reflection cross correlation.

11. A method according to claim 1, wherein comparing the measured frequency response and the plurality of modelled frequency responses comprises comparing the phase of the measured frequency response and the plurality of modelled frequency responses.

12. A method according to claim 1, the method further comprising:
determining an echo window based on the reference reflection; and
using the echo window to determine the length of the measurement reflection.

13. A method according to claim 12, further comprising:
trimming the measurement reflection to be the length of the echo widow, wherein the start of the trim is the start of the reference reflection.

14. A method according to claim 1, wherein the measurement ultrasonic signal is a pulse signal.

15. An apparatus for determining a characteristic of a measurement intermediate layer in a multilayer structure using an ultrasonic transducer; comprising:
at least one controller configured to carry out the method of claim 1.

16. A non-transitory computer readable storage medium comprising computer readable instructions that, when read by a computer, cause performance of the method as claimed in claim 1.

* * * * *